May 9, 1950 C. CHISHOLM 2,506,704
TYPE WHEEL SHIFT MECHANISM FOR TYPEWRITING
MACHINES AND THE LIKE
Original Filed July 20, 1946 6 Sheets-Sheet 1

INVENTOR.
CLIFTON CHISHOLM
BY Bates, Teare, & McKean
ATTORNEYS

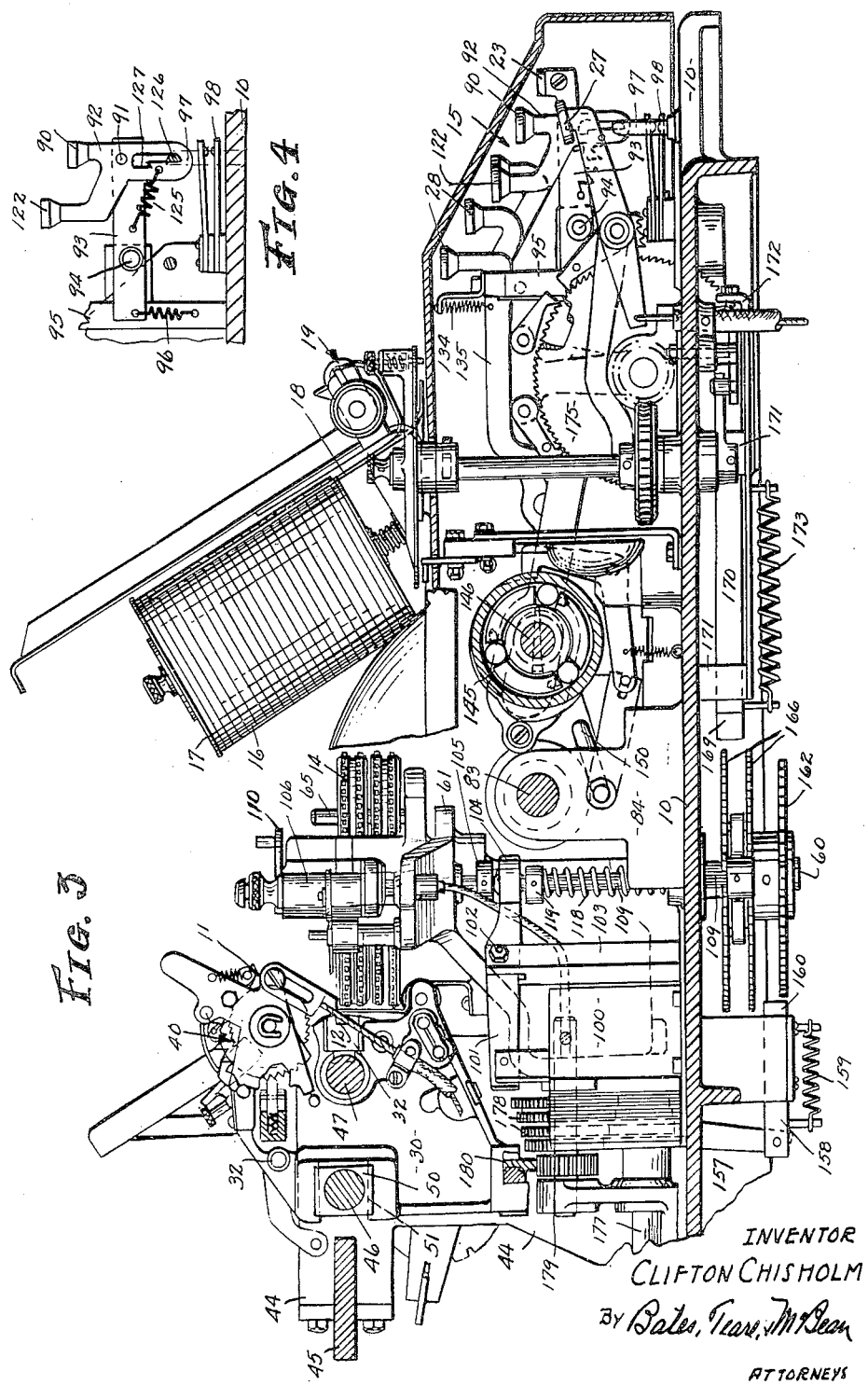

May 9, 1950 C. CHISHOLM 2,506,704
TYPE WHEEL SHIFT MECHANISM FOR TYPEWRITING
MACHINES AND THE LIKE
Original Filed July 20, 1946 6 Sheets-Sheet 4

INVENTOR
CLIFTON CHISHOLM
ATTORNEYS

INVENTOR.
CLIFTON CHISHOLM
BY
ATTORNEYS

INVENTOR.
CLIFTON CHISHOLM
BY
Bates, Teare, McDean
ATTORNEYS

Patented May 9, 1950

2,506,704

UNITED STATES PATENT OFFICE 2,506,704

TYPE WHEEL SHIFT MECHANISM FOR TYPEWRITING MACHINES AND THE LIKE

Clifton Chisholm, Cleveland Heights, Ohio, assignor of one-fourth to Marie F. Chisholm, Cleveland Heights, and one-half to Henry C. Osborn, Cleveland, Ohio Original application July 20, 1946, Serial No. 685,107. Divided and this application June 6, 1947, Serial No. 752,995

6 Claims. (Cl. 197—71)

This application is a division of my copending application, Serial No. 685,107, filed July 20, 1946, on a Keyboard operated machine.

The present invention and application relates to an improved type carrier shift mechanism for printing machines and the like. The invention is especially concerned with the provision of an improved type wheel shift mechanism for keyboard controlled printing machines such as typewriters and the like, and particularly power operated machines. These, therefore, are the general objects of the present invention.

Another object of the present invention is to provide a power operated keyboard controlled typing machine with an improved supporting and positioning mechanism for a plurality of rotatable type wheels, each of which has a plurality of annular bands of type extending about its periphery, such structure being arranged to facilitate accurate location, in a predetermined position, of any selected type in any band of type, and being arranged so that the type wheels may be easily and quickly shifted to select the band of type to be used.

Other objects and advantages of the invention will become more apparent from the following description, reference being had to the accompanying drawings in which there is illustrated a preferred embodiment of the invention. The essential characteristics of the invention will be summarized in the claims.

Figure 1:
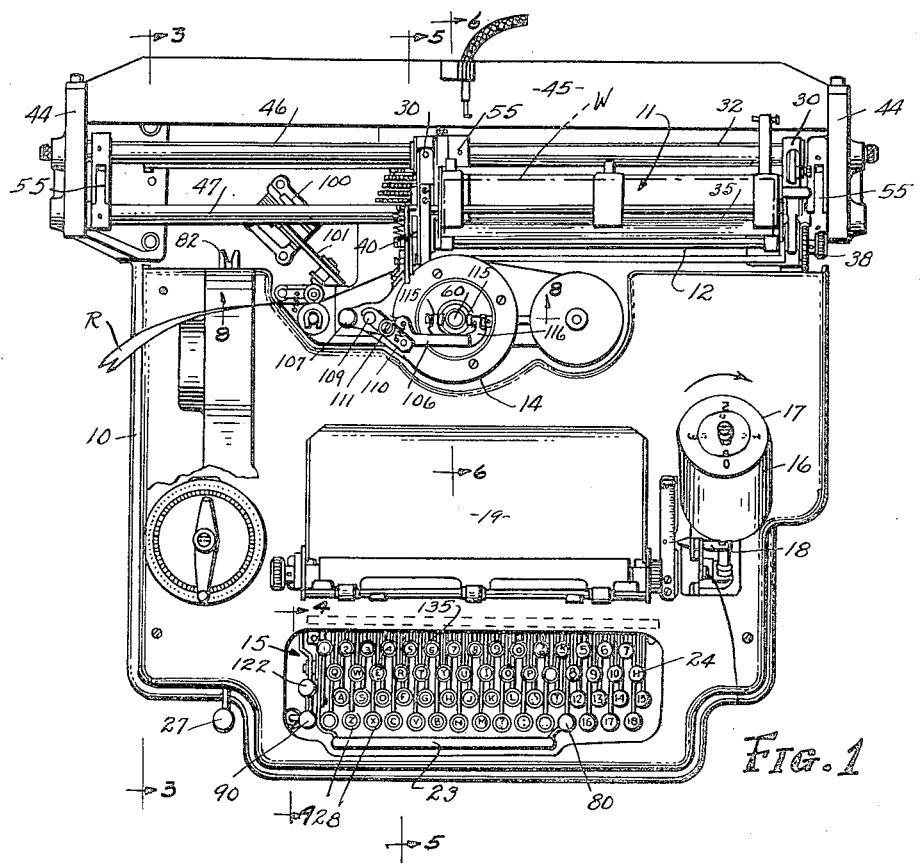
Figure 10:
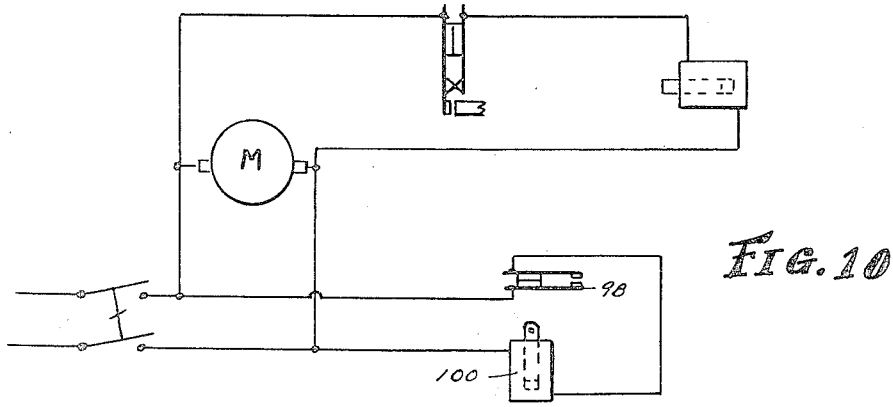
Figure 2:
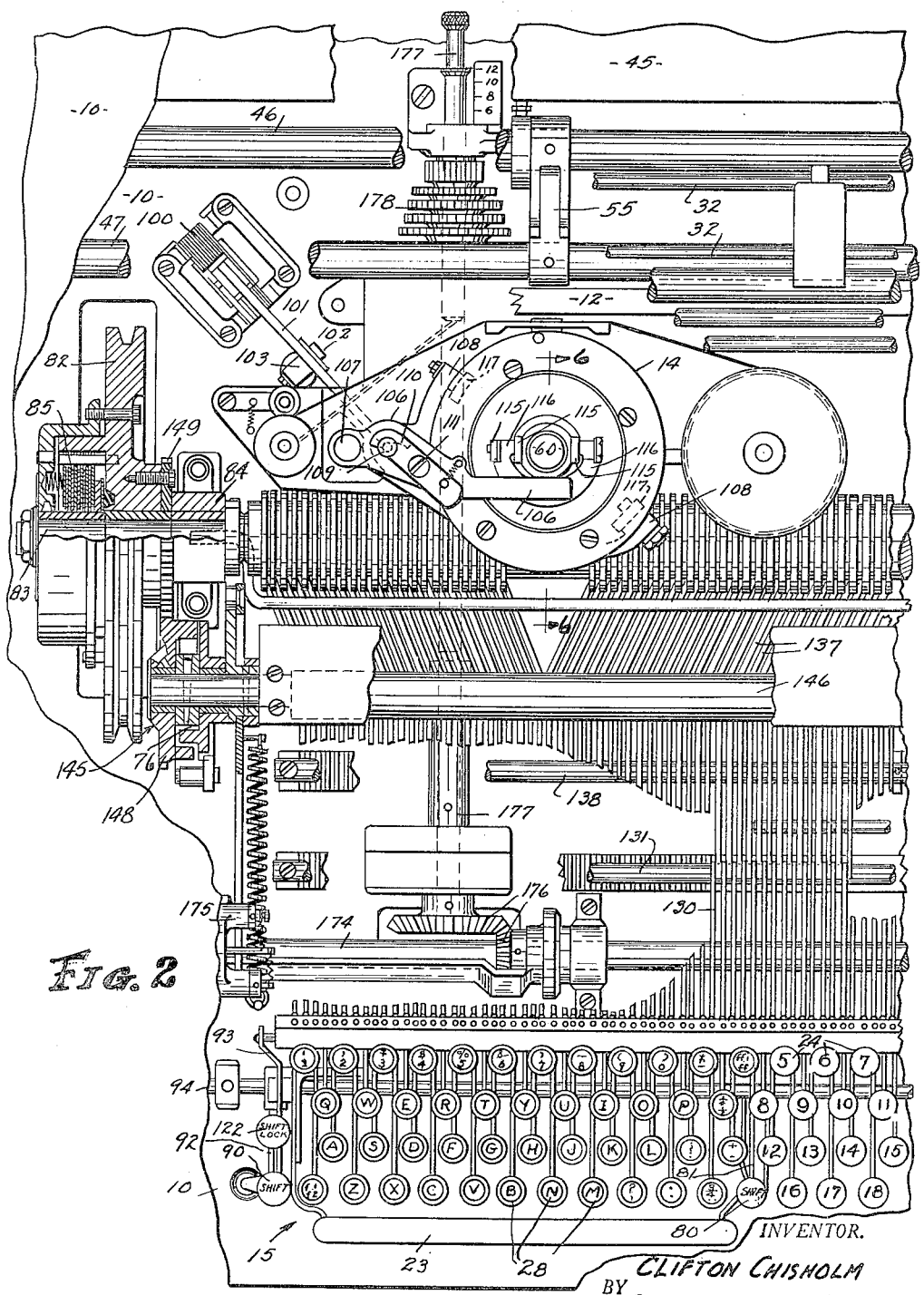
Figure 5:
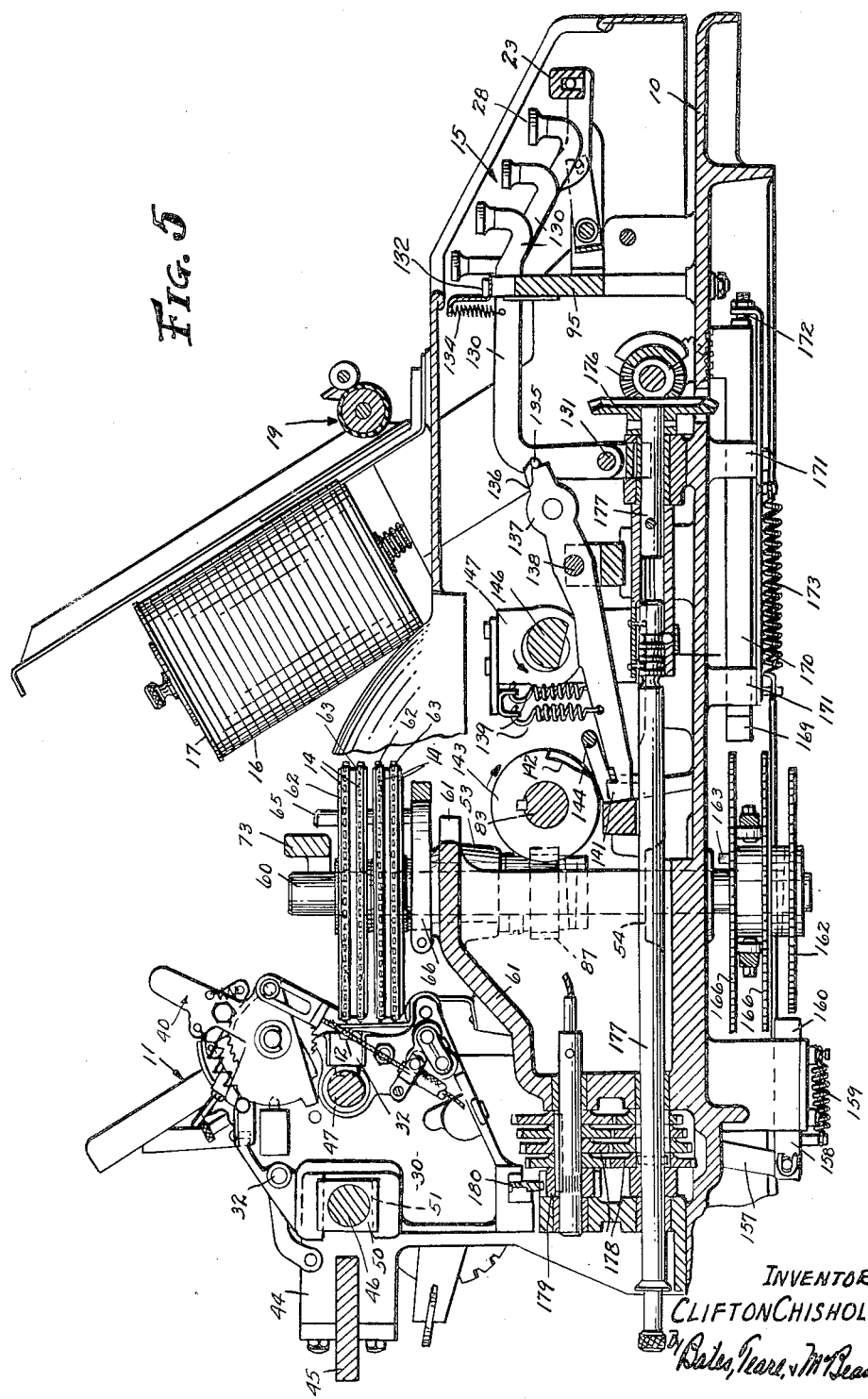
Figure 6:
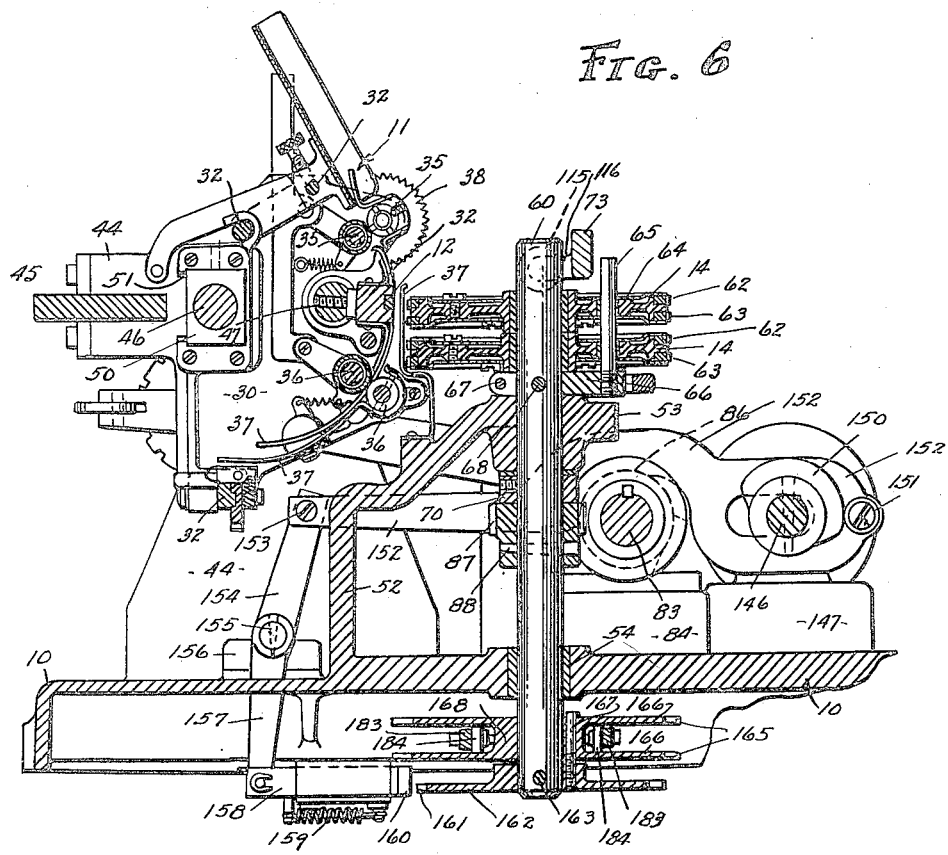
Figure 7:
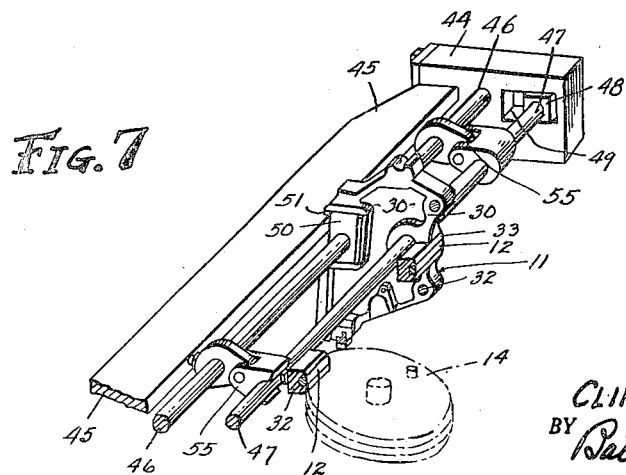
Figure 8:
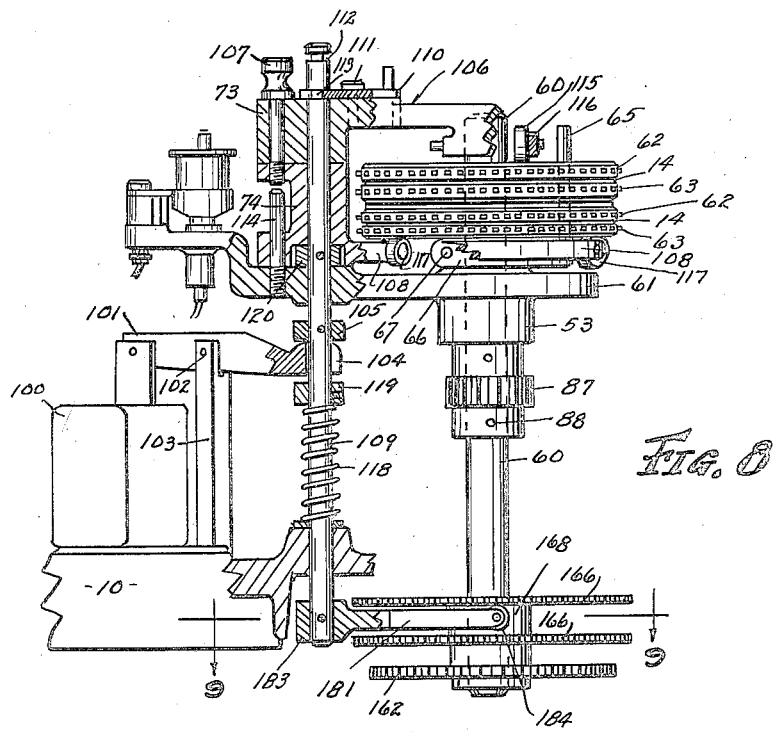
Figure 9:
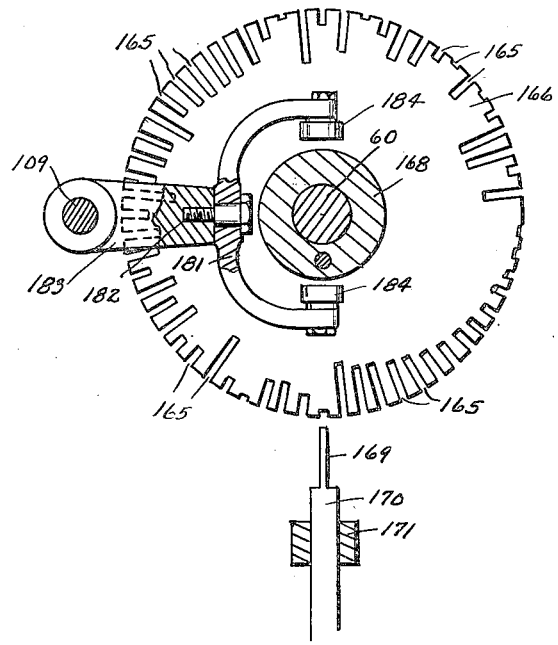

In the drawings, Fig. 1 is a plan view of a machine embodying my invention; Fig. 2 is a fragmentary plan view, on an enlarged scale, illustrating the type wheels and associated mechanisms, certain parts being broken away to more clearly illustrate various parts of the operating mechanisms; Fig. 3 is a longitudinal vertical section, the plane thereof being indicated by the lines 3—3 on Fig. 1; Fig. 4 is a fragmentary vertical section illustrating a key control for the type wheel shift mechanism, the plane of the section being indicated by the lines 4—4 on Fig. 1; Fig. 5 is a vertical section, similar to Fig. 3 but taken in a plane indicated by the lines 5—5 on Fig. 1; Fig. 6 is a fragmentary vertical section through the type wheels and associated mechanism, the plane of the section being indicated by the lines 6—6 on Figs. 1 and 2; Fig. 7 is a fragmentary perspective view illustrating a portion of the paper carriage together with portions of its supporting and actuating mechanisms; Fig. 8 is a transverse vertical section, and its plane is indicated by the offset line 8—8 on Fig. 1; Fig. 9 is a sectional detail, the plane of which is indicated by the line 9—9 on Fig. 8; and Fig. 10 is an electrical diagram illustrating an electrical circuit for the machine.

The present invention is illustrated in connection with the keyboard operated machine of my copending application, Serial No. 685,107, and reference may be had to such application for a more complete description thereof.

Referring to Fig. 1 of the present application, it will be seen that the keyboard controlled printing machine comprises a frame 10 which supports a paper carriage 11. The paper carriage is progressed across the frame from right to left by a suitable variable feed mechanism, and carries a platen 12 and a work sheet W. The variable feed mechanism illustrated forms the subject of my copending application, Serial No. 751,303. A series of type wheels 14 are mounted on the frame 10, for rotation as a unit about a vertical axis. Each type wheel 14 carries an entire font of type, including both upper and lower case letters. One wheel, for instance, may carry 6-point type, another 8-point type, another 10-point type, etc.

A keyboard 15 controls mechanism which brings the desired type of a selected font into printing position. The keyboard 15 also controls a mechanism which causes the paper carriage 11 to move bodily toward the type wheels 14 to cause an impression to be made from the selected character or type. Such mechanisms are included in the subject matter of my copending application, Serial No. 685,107.

Following the impression of a character on the work sheet, the paper carriage 11 is moved from right to left a distance which is determined by the width of the character last impressed. The total number of spaces between the words of a printed line, and the total distance the work sheet is advanced, controls the relative positions of a justifying scale 16 carried by a drum 17 and an indicator 18 which are mounted at the right hand side of the machine in front of the paper carriage.

To facilitate the operation of the mechanism, a copyholder, generally indicated at 19, is positioned between the keyboard 15 and the type wheels 14. The arrangement of this copyholder is such that the operator sets the desired line of the copy into a position where it is readily visible.

During the first typing, or printing of the copy, the operator uses a space bar 23 of the keyboard 15 to cause the paper carriage to be advanced for word spacing. Each time this space bar is actuated it causes the carriage to be advanced a predetermined distance, which, in the construction illustrated, is four units. Each time a character key 28 is actuated, the carriage 11 is advanced a number of units equivalent to the width of the type selected by the actuation of such key.

The keyboard 15 is also provided with a plurality of justifying space keys 24 each of which, when actuated, causes the carriage to be advanced a different number of units. In the form illustrated the keys are arranged to advance the carriage any desired number of units from five to eighteen inclusive.

The operator, during the initial typing, causes the typed line to approach the desired length as nearly as possible and then reads the scale 16. At this time the indicator 18 is opposite indicia on the scale 16 which will indicate which space key or keys 24, if used instead of the space bar 23, in retyping for word spacing, will cause the typed line to be justified or extended to a length equal to the length of line desired for the finished copy. This designation is then typed at the end of the line.

Following the typing of the justification data at the end of a typed line, the operator depresses a release key 27. The depression of this key causes the paper carriage 11 to be returned to its right hand or starting position, advances the work sheet on the carriage 11 to position it to receive the next line to be printed, and causes the justifying scale 16 and indicator 18 to return to their starting positions. Thus the machine is made ready for the typing of the next line.

After all lines of a page have been typed or printed, the initial copy is removed from the carriage 11 and placed in the copyholder 19, and the sheet is then retyped. During this retyping the words are spaced by the keys 24 as designated by the typed data at the end of the respective lines. The retyped page is thus justified and simulates a letter press impression.

The work sheet or paper carriage 11 and the platen 12 are best illustrated in Figs. 1, 3, 5 and 6. As there illustrated, the paper carriage 11 comprises a pair of end plates 30, spaced apart by cross frame members, which are secured at their ends to the end plates. One frame member or bar 32 is positioned at the front of the carriage and is provided with a longitudinally extending, forwardly facing groove in which a plastic bar, which comprises the platen 12, is fixedly seated.

Mounted above the platen 12 are a pair of coacting work sheet guide rollers 35 (Fig. 6), while a similar set of rollers 36 are mounted below the platen. A work sheet is passed between and gripped by the pairs of rollers 35 and 36 and held tightly against the platen thereby. Suitable plate-like guide members 37 guide the work sheet and prevent undesired contact between it and various parts of the mechanism.

As indicated in the drawings, the work sheet may be fed upwardly for line spacing by rotating one of the rollers 35 which is provided with a knob 38 (Fig. 1).

The work sheet may be advanced by a ratchet mechanism generally indicated at 40 in Figs. 4, 6 and 7. This ratchet mechanism is similar to that used on typewriters. Suffice it to say that it is operated to advance the work sheet a line at a time consequent upon the actuation of the release key 27 by the operator.

The paper carriage 11 is mounted for movement from right to left (Fig. 1) transversely across the machine. As shown in Figs. 1 to 6, the frame 10 of the machine is provided with a pair of upstanding side brackets 44 which are connected adjacent their upper ends by a comparatively rigid reenforcing bar 45. Also mounted in and extending between the brackets 44 are a pair of rods 46 and 47. The rod 46 is mounted in the brackets 44 for rotation about a fixed axis relative thereto, while the rod 47 is mounted in guide blocks 48 which are slidably mounted in horizontally extending ways 49 formed in the brackets 44.

The paper carriage is mounted on the rods 47 and 48 for movement axially thereof. As indicated in Fig. 7, the carriage end plates 30 are slidable axially along the rod 47 which is journaled in such plates. Journaled on, and slidable axially of the rod 46, are a pair of blocks 50 which are slidably mounted in ways 51 formed in respective carriage end members 30. Thus the carriage may move or reciprocate horizontally relative to the bar 46, the axis of which is fixed relative to the frame brackets 44. This reciprocation of the carriage is used to effect the printing operation.

The type wheels 14 are best shown in Figs. 1 and 8. In the present embodiment I have illustrated a plurality of type wheels 14, all of which are mounted on the upper end of a vertically extending shaft 60. This shaft is journaled in a horizontally extending portion 61 of an upstanding bracket formation 52 of the frame 10, as at 53, and in a bushing 54 carried by the main frame. Each type wheel carries on its periphery two annular sets or bands of type. The type in the top band 62 of each type wheel 14 comprise lower case type, whereas those in the bottom bands 63 comprise upper case type. The upper wheel 14 may carry, for instance, six point type, and the lower wheel eight point type.

The present invention is particularly concerned with the mounting of the type wheels and with the means for locating the desired type wheel and the desired band of type thereof in printing position. Such mechanism and locating means will now be described.

The type wheels are drivingly connected with their supporting shaft 60. A collar 66 is clamped and pinned to the shaft 60 as at 67 and 68. This collar carries a vertically extending pin or rod 65 which engages aligned openings 64 formed in the type wheels 14. The type wheels are thus drivingly connected with the shaft 60 and are mounted for axial movement thereon. The shaft 60, however, is restrained from axial movement by the collar 66 and a collar 70 which embracingly coact with the horizontal portion 61 of the frame bracket 52.

The type wheels are normally rotated by a motor M (Fig. 10) which may be drivingly connected by a suitable V-shaped driving belt, not shown, with a drive pulley indicated at 82 in Fig. 2. This pulley is rotatably mounted on a shaft 83 which extends transversely across the frame 10 being journaled in suitable bearings 84. A friction clutch 85, interposed between the pulley 82 and the shaft 83, permits the rotation of the shaft to be stopped for the printing operation without stopping the rotation of the drive pulley 82. As such clutches are well known, no detailed description will be given. Secured to the shaft 83, intermediate its ends, is a gear 86 which meshes with a gear 87 drivingly secured to the type wheel shaft 60 as by a pin 88.

As heretofore mentioned, the type wheels 14 are mounted for axial movement on the shaft 60 to bring a band 63 of type into printing position, that is, into horizontal alignment with the platen 12. This movement of the type wheels is controlled from the keyboard 15, and particularly by a shift key 90, Figs. 1, 3 and 4. As shown in Fig. 4, the key 90 is secured to a plate 92 which is pivotally mounted as at 91 on a lever 93. This lever is secured to a shaft 94 which is journaled in upstanding frame members 95. A spring 96 normally retains the lever in an inactive position, shown in Fig. 4. When the key 90 is depressed by the operator, the lower end 97 of the plate 92 contacts a leaf-type switch 98 energizing an electric circuit which causes the energization of a solenoid 100.

The solenoid 100 is best illustrated in Figs. 1 and 8, and is arranged to actuate a lever 101 pivoted at 102 to a frame bracket or post 103. When the solenoid is energized, the yoked end 104 of the lever coacts with a collar 105 pinned to a vertically extending rod 109 and raises the rod vertically in its bearings in the frame 10 and the frame bracket 53.

Axial movement of the rod 109 is imparted to the type wheels 14 by a carriage 106. This carriage comprises an upper member 73 and a lower member 74 which are normally secured together as a unit by a set screw 107. The carriage 106 is positioned vertically on the shaft or rod 109 by a manually operable latch 110 pivoted as at 111 to the upper carriage member 73 and arranged to selectively engage vertically spaced grooves 112 or 113 in the rod 109. When the latch is in the lower recess 113, as shown in Fig. 8, the upper type wheel 14 is in printing position and when the latch is in the groove 112 the lower type wheel is in printing position. Rotary movement of the carriage 106 is prevented by a vertically extending pin 114 carried by the bracket 53 and having a sliding engagement with the carriage.

Normally the band of type 62 is in alignment with the platen 12. The raising of the rod 109 by the solenoid 100 raises the carriage 106 a distance sufficient to bring the band of type 63 into alignment with the platen 12. The carriage is connected to the type wheels 14 by two pairs of rollers. One pair of rollers 115 is carried by arms 116 of the upper carriage member 73 and engages the upper surface of the top type wheel 14. The other set of rollers 117 is carried by arms 108 of the carriage member 74 and engages the bottom surface of the lower type wheel 14. The type wheels 14 are gripped between the two sets of rollers 115 and 117 and accurate alignment of the printing impressions is possible.

To minimize the effort required to raise the type wheels 14 and to ease the load on the solenoid 100, I encircle the rod 109 with a spring 118. This spring is interposed between the frame 10 and a collar 119 and serves to counterbalance a portion of the weight of the carriage 106 and the type wheels 14, and yet insure the return of the type wheels to normal position, shown in Fig. 8, under the influence of gravity. The lower position of the type wheels is limited by a collar 120, which is shown in Fig. 8 as being pinned to the rod 109, while the uppermost position is limited by the collar 105 likewise pinned to the rod 109. These collars are arranged to engage respective faces of the frame bracket 53 heretofore described.

The shift mechanism for moving the type wheels to their upper case positions may be latched to retain the wheels in such position. To accomplish this the operator depresses a key 122 (Fig. 4) instead of the key 90. This key is mounted on the plate 92 (Fig. 4) and is arranged so that when depressed it will cause the plate to swing in a counterclockwise direction against the action of a spring 125 which is interposed between the lever 93 and the plate 92. When the key 122 is depressed, a stationary cam member 126 will engage a locking notch 127 formed in the plate 92 and is retained in such position by the spring 125 until the key 90 is depressed. The depression of the key 90 swings the plate 92 in a clockwise direction, thus moving the notch 127 out of engagement with the cam 126, permitting the spring 96 to return the key and key lever to their normal position and opening the switch 98 and the circuit to the solenoid 100.

The shift to the lower band 63 which contains upper case type may also be made by depressing a key 80 (Fig. 1) at the right hand side of the keyboard 15. This key 80 is connected with a lever 81 which is secured to the shaft 94 heretofore described.

The depression of the letter or space key 28 or 24 stops the rotation of the type wheel 14 with the selected type or quad in printing position. As shown, in Fig. 5, each key 28 or 24, as well as the space key or bar 23, is secured to a respective key lever 130, which is pivoted to a stationary shaft 131.

The key levers 130 are normally held in their uppermost position, against a stop bar 132 carried by the frame members or posts 95 heretofore mentioned, by individual springs 134. Each key lever 130 carries a pin 135 which is normally in latching engagement with a notch 136 formed in the end of a respective lever 137. The levers 137 are pivoted to a stationary rod 138, and are normally retained in the position shown in Fig. 5 by individual springs 139.

When the operator depresses a key 28, 24, or the bar 23, the pin 135 of such key lever 130 is withdrawn from the notch 136 in the respective lever 137, whereupon a spring 139 rocks such lever clockwise about its pivot shaft 138, causing a lug 141 on the end of such lever to engage a notch 142 in a disc 143. There are a plurality of such discs, one for each lever 137, and they are keyed to the drive shaft 83 so that their notches 142 are spaced circumferentially one from the other. Thus each disc will stop the rotation of the shaft 83 and the type wheel 14 in a different circumferential position. Accordingly, any selected character of a band of type may be brought into printing position relative to the platen 12.

The depression of a key 23, 24 or 28 also initiates the movement of a cam shaft 146. As shown in Figs. 2 and 5, the rocking of a lever 137, as a result of the depression of a key, causes such lever to engage a bail 144 the ends of which are pivoted in the stationary bearing members 84 heretofore described. The movement of the bail 144 controls a single revolution clutch generally indicated at 145 in Figs. 2 and 3. The driving member 76 of this clutch is secured to the cam shaft 146 which is mounted on the frame 10 in bearings 147. The driven member 148 of the clutch 145 is drivingly connected by gearing 149 with the drive pulley 82.

The rotation of the cam shaft 146 controls the locking of the type wheels in their selected position. A cam disc 150 (Fig. 6) is secured to the shaft 146 and coacts with a roller 151 on a link 152 which is pivotally connected as at 153 with a lever 154 secured to a rod 155. This rod is journaled in bearings 156 and carries a lever 157 which is pivotally connected with a locking bolt 158. As the shaft 146 rotates the cam disc 150 permits a spring 159 to move the bolt to the right so that the V-shaped end 160 thereof engages one of a plurality of notches 161 in a disc 162 which is secured as by a pin 163 to the lower end of the type wheel shaft 60. Following the making of the impression, hereinafter to be described, continued rotation of the cam disengages the bolt 158 from the disc 162.

Continued movement of the cam shaft 146, following the locking of the type wheels 14, causes the carriage 11, together with the work sheet carried thereby, to move bodily against the type wheel 14, thus making an impression through a suitable ribbon R on the work sheet W from the selected type. A cam disc, not shown, but which is secured to the right hand end of the shaft 146, is drivingly connected with the rod 46 which supports the paper carriage 11. Reference may be had to my copending application, Serial No. 685,107, for a complete description of this connection. Suffice it here to say, that this connection is such as to cause periodic oscillation of the shaft 46. This shaft is connected to toggles 55 (Fig. 7) which act to move the shaft 47 into and out of contact with the type wheels 14 to make the required impression. The arrangement is such that the printing operation takes place while the bolt 158 retains the type wheels rigid. A more complete description of this mechanism may be had by reference to my copending application.

Reference to my application, Serial No. 685,107, may be had for a description of the restoration of the key levers to their normal positions and for the mechanism which controls the letter spacing of the paper carriage 11. Suffice it here to say that the key levers are restored by rotation of the cam shaft 146 and that the distance the carriage 11 is advanced is determined by the depth of notches 165 in a disc 166 (Figs. 6 and 9).

As shown in Fig. 8, two discs 166 are secured to a common hub 168. These discs are mounted for vertical movement on the lower end of the type wheel shaft 60 and are driven by a pin 167 carried by the disc 162 and which engages a suitable opening in the hub 168. Each of these discs 166 contains a plurality of peripherally spaced notches 165, the position, depth and number of which vary according to the position, width and number of corresponding type in the type wheels 14. As the shaft 60 is rotated to bring a specific type character or space quad into printing position, the notch 165 corresponding to such character or space quad is brought into alignment with a spur 169 carried by a plunger or justifying bar 170 mounted for reciprocation in suitable brackets 171 formed on the under side of the frame 10. This bar is normally held in a retracted position against an adjustable stop 172 by a spring 173.

The rotation of the shaft 146 during the making of the impression releases a mechanism which causes the bar 170 to be urged forward yieldingly until the end 169 thereof seats in the notch 165 of the disc 166 which at that time is aligned therewith. This variably limited movement of the bar 170 is transmitted to a ratchet mechanism generally indicated in Fig. 3 at 175. This ratchet mechanism is connected (Fig. 5) by gearing 176, shafts 177, and gearing 178 with a pinion 179 which coacts with a rack 180 secured to the paper carriage 11. A suitable spring, not shown, returns the carriage to its right hand or starting position consequent upon the depression of the release key 27 as explained in my prior application, Serial No. 685,107.

As heretofore mentioned, two notched discs 166 are provided. The top disc is used for the lower case bands 62 of type, while the bottom disc is used for the upper case bands 63 of type. The arrangement is such that when the type wheels are raised so that the bottom band of type 63 of a type wheel is brought into printing position, the bottom disc 166 will be brought into alignment with the bar 170. As shown in Figs. 8 and 9, a yoke 181 is pivotally connected, as at 182, with an arm 183. This arm is secured to the rod 109 which controls the movement of the type wheels 14 to present upper or lower case characters to printing position as desired. The yoke 183 is provided with a pair of rollers 184 which engage the under surface of the uppermost disc 166. Accordingly, the discs 166 are raised simultaneously with the raising of the type wheels 14. Such raising movement raises the uppermost or lower case disc 166 out of the path of the bar 170, and moves the lowermost disc 166 into position to be engaged by such bar.

I claim:

1. In a machine of the character described, a frame, a horizontally extending platen carried by said frame, a vertically extending shaft mounted in said frame, a pair of wheels mounted one above the other on said shaft for axial movement relative thereto, a driving connection between said shaft and said wheels, a plurality of vertically spaced bands of type extending circumferentially about each of said wheels, a carriage, a support mounted for vertical movement on said frame, connections between support and said carriage and between said carriage and said wheels whereby the vertical movement of said support moves said wheels axially to selectively position said wheels relative to said platen, key controlled means to move said support a distance equal to the distance between the bands of type, and settable means to position said carriage on said support with a predetermined wheel in active position.

2. In a keyboard operated printing machine, a frame, a shaft rotatably mounted in said frame, a type wheel mounted on said shaft for axial movement relative thereto, a driving connection between said shaft and said wheel whereby rotation of the shaft is imparted to said type wheel, a carriage mounted on said frame for movement in a direction parallel with the axis of said shaft, and key controlled means for determining the position of said carriage, said carriage having a pair of spaced arms projecting toward said shaft on opposite sides of said wheel and rollers carried by said arms and engaging opposite faces of said wheel.

3. In a keyboard operated printing machine, a frame, a vertically extending shaft mounted in said frame, a type wheel mounted on said shaft for axial movement relative thereto and provided with a pair of annular bands of type on its periphery, a pair of carriage members mounted on said frame for vertical movement on said frame, one of said carriage members having an arm projecting beneath said type wheel, a pair of rollers mounted on said arm and engaging the under surface of said wheel to support the same, the other carriage member having an arm projecting above said wheel, a pair of rollers mounted on said last named arm and engaging the upper surface of said wheel, releasable means to secure said carriage members together, and key controlled means to determine the vertical position of said carriage members.

4. In a keyboard operated printing machine, a frame, a vertically extending shaft mounted in said frame, a type wheel mounted on said shaft for axial movement relative thereto and provided with a pair of annular bands of type on its periphery, a pair of carriage members mounted on said frame for vertical movement on said frame, one of said carriage members having an arm projecting beneath said type wheel, a pair of rollers mounted on said arm and engaging the under surface of said wheel to support the same, the other carriage member having an arm projecting above said wheel, a pair of rollers mounted on said last named arm and engaging the upper surface of said wheel, means to secure said carriage members together, means to limit the downward movement of said members, means to limit the upward movement of said members, resilient means acting on said carriage members to counteract a portion of the weight of said carriage members and wheel, and means to move said members upward.

5. In a machine of the character described, a frame, a vertically extending shaft journaled in said frame, a pair of type wheels mounted on said shaft for axial movement relative thereto, a second shaft mounted for vertical movement in said frame, means to limit such vertical movement, a carriage mounted on said second named shaft, means to secure said carriage against vertical movement on said shaft in either of two positions, each of said wheels having two vertically spaced bands of type extending about its periphery, means to move said second named shaft axially a distance equal to the spacing of said bands, arms on said carriage and embracing said type wheels whereby the vertical position of the carriage determines the vertical position of said type wheels relative to their supporting shaft, resilient means acting on said second named shaft and tending to exert an upward force on said shaft sufficient to overcome a portion of the weight of said carriage and said wheels, but insufficient to move said wheels and carriage upward in the normal operation of the machine, and means under control of the operator to selectively raise said shaft to position said wheels vertically of the machine.

6. In a keyboard operated machine, a frame, a plurality of keys, a vertically extending shaft rotatably mounted in said frame, a pair of type wheels mounted on said shaft for rotation as a unit therewith and for axial movement relative thereto, a pair of axially spaced bands of type mounted on the periphery of each of said wheels with one band of one wheel in alignment with a predetermined printing position, a solenoid, an axially movable vertically extending shaft mounted in said frame, means interconnecting said last named shaft with said solenoid to move said shaft axially consequent upon energization of said solenoid, a carriage mounted on said axially movable shaft, means to adjustably position the carriage axially on said axially movable shaft, said carriage being provided with a pair of arms axially embracing said wheels whereby said wheels move axially as a unit with said carriage but are free to rotate relative thereto, resilient means normally acting to raise said axially movable shaft but of insufficient force to overcome the forces of gravity acting to move said shaft downward, and key controlled means for energizing said solenoid to supplement said resilient means and raise said carriage and type wheel.

CLIFTON CHISHOLM.

REFERENCES CITED

The following references are of record in the file of this patent:

UNITED STATES PATENTS

| Number | Name | Date |
|---|---|---|
| 486,889 | Neal et al. | Nov. 29, 1892 |
| 549,523 | Moore | Nov. 12, 1895 |
| 1,069,275 | McCool | Aug. 5, 1913 |
| 1,929,064 | Hart | Oct. 3, 1933 |
| 2,165,223 | Chisholm | July 11, 1939 |